Jan. 27, 1931.   J. G. JACKSON   1,790,504
CRACKER PAN
Original Filed March 3, 1927
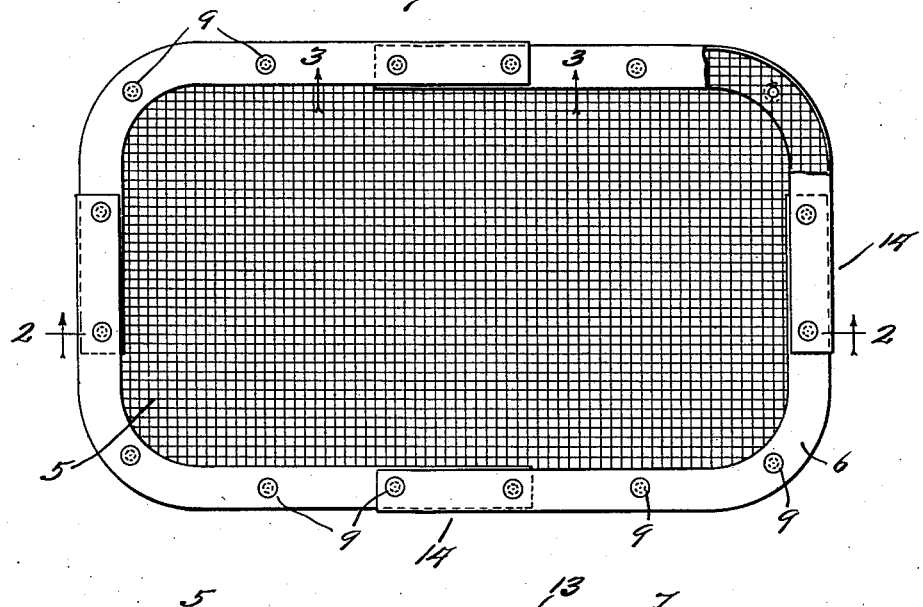
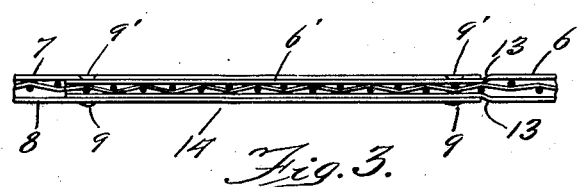

Patented Jan. 27, 1931

1,790,504

UNITED STATES PATENT OFFICE

JOSEPH GEORGE JACKSON, OF CHICAGO, ILLINOIS, ASSIGNOR TO EDWARD KATZINGER COMPANY, OF CHICAGO, ILLINOIS, A CORPORATION OF ILLINOIS

CRACKER PAN

Original application filed March 3, 1927, Serial No. 172,431. Divided and this application filed October 10, 1928. Serial No. 311,613.

The present invention relates to cracker pans and other such like devices, and has for its primary object to provide an improved frame structure for such devices which will enhance the durability of the device, cheapen its construction, and otherwise improve the same.

Other objects of the invention will appear hereinafter, the novel features and combinations being set forth in the appended claims.

This application is a division of my copending application, Serial No. 172,431, filed March 3, 1927, for cracker pans.

For the purpose of illustrating the salient features of the invention, one embodiment is shown in the accompanying drawings in which—

Fig. 1 is a plan view of a cracker pan embodying my invention;

Fig. 2 is a longitudinal section on the line 2—2 of Fig. 1 looking in the direction of the arrows; and Fig. 3 is an enlarged detail sectional view of a portion of Fig. 1, looking in the direction of the arrows 3, 3 and showing the frame joint.

Referring to the accompanying drawing, the cracker pan comprises a supporting surface 5 preferably made of wire mesh, screen, or mesh cloth, with a frame 6 for stretching the screen or cloth, binding its edges and reinforcing the same. The present invention is concerned with the frame structure comprising a plurality of elbow sections to form rounded corners for the cracker pan. Each of these elbow sections comprises a folded band U-shaped in cross-section, preferably of metal, such as iron bent into the proper form and adapted to be joined to the other elbow sections and to the screen or cloth 5.

The periphery of the flat screen is cut to proper size and shape and then inserted into the U-shaped folds 7, 8 of the elbow sections and rivets 9 employed for anchoring the screen 5 between the folds 7, 8. These rivets 9 pass through the folds 7, 8 and through the mesh of the screen.

In order that the pan may be slid or otherwise moved over a supporting surface, such as a plane oven bottom, or over any other surface, without being obstructed in its sliding movements, it is desirable that the opposite flat faces of the elbow sections shall be flush with each other on adjacent sections. This is desirable on both sides of the cracker pan. To this end, the joints between the elbow sections are especially constructed so that the flat opposite faces which are parallel to the plane of the screen will not project at any portions thereof above or below such faces. The heads of the rivets 9 are countersunk as shown at 9' in Fig. 3 to maintain the flat, plane surface of the joined sections of the cracker pan frame.

In order to secure rigidity of the frame and reinforce the same where the elbow sections are connected, telescoping joints are used between the adjacent ends of the elbow sections. The end of one elbow section is retained of uniform size and cross-section, but the end of the other section which is joined therewith has countersunk portions as illustrated at 13, 13 to produce a U-shaped extension 6' which will fit closely between the folds 7, 8 of the end into which the extension 6' telescopes. In other words, to realize continuous flush faces on opposite sides of the pan in this telescopic joint the folds of the end of one of the elbow sections are compressed to a smaller dimension so as to fit into a U-shaped recess of the end of the next adjacent elbow section.

The rivets 9 at the telescopic joint 14 may have rounded heads on the bottom as shown in Fig. 3, and countersunk flat heads as indicated at 9' on the upper side of the frame. In this manner, uniform thickness of the pan frame is maintained around the whole periphery of the cracker pan. Between the telescopic joints 14 the rivets 9 anchor the peripheral portion of the wire screen to the frame and at the telescopic joints the rivets 9 serve the double function of maintaining the screen in place, as well as holding the telescopic joint rigidly and permanently in position.

Due to the expanse of the wire screen and the more or less rough usage to which cracker pans are subject, the edges of the wire screen tend to become loosened from an outer frame around the wire screen and to which the latter is secured. However, by providing a U-shaped metal band to constitute the outer securing frame, the ends of the wires cannot project from the frame into position where such wires might injure the hands of the users.

It should also be noted that the telescopic joints 14 are intermediate the rounded corners and therefore corner sections of the frames may be kept in stock with the legs of such corner sections of varying lengths so that cracker pans of varying sizes, as desired, may be quickly and readily assembled by cutting wire screen of the desired shape and size and then selecting from stock the corner frame with legs of lengths to fit the screens that have been cut.

Therefore, by means of the construction shown and described, the corners and edges of the cracker pan will always present smooth surfaces to the hands of the users and at the same time the frame will be strong and durable, the joints being reinforced by having four layers of metal instead of two, as shown by the folds designated 7, 8. In other words, by reducing the thickness of a portion of the end of one section and telescoping it into the folds 7, 8 of the next adjacent section and riveting the telescoping ends together, a reinforced joint is obtained, the surfaces of which are flush or in the planes of the faces of the remainder of the elbow sections. By properly reinforcing the joints and providing integral corner frames a cracker pan is obtained which is strong and durable and may be subjected to hard usage without becoming distorted and without displacing any of the ends of the wires into any positions where they will come into contact with the hands of the users.

The means for securing the frame sections to each other and to the wire screen are such as to provide flush surfaces on opposite faces of the peripheral frame to permit the cracker-pan to slide freely over the oven floor and other surfaces on which the cracker pan is placed and moved about. It will also be seen that the construction is such as to necessitate a minimum amount of sheet metal or metal plate, thereby lessening the cost of construction and lessening the weight of the same to facilitate its use without sacrificing strength and durability.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. A cracker pan comprising a screen carrier and a frame therefor embodying in its construction a plurality of folded U-shaped metal corner sections joined together with their ends in telescoping relation to one another between the corners of the frame, with the faces of the folds of adjacent sections flush with one another, and means passing through the folds of the sections for holding the ends together.

2. A cracker pan embodying in its construction a flat support and a peripheral frame therefor, said frame comprising a plurality of corner frame sections each U-shaped in cross-section, means for securing the peripheral edge of said support in the U-shaped recess of the frame, telescoping joints between the ends of the next adjacent corner sections, and rivets for permanently securing together said telescoping joints and permanently securing the peripheral edge of said support in the U-shaped recess of said frame.

3. A cracker pan comprising a carrier and a frame therefor embodying in its construction a plurality of folded U-shaped metal corner sections having arms extending in directions at right angles to each other, and means comprising rivets for permanently joining the adjacent ends of the arms of said sections together in telescopic relation with the opposite faces of the folds of the adjacent sections between the corners of the pans flush with one another.

4. A cracker pan comprising a wire screen carrier, a frame therefor comprising four corner sections each having a U-shaped recess into which the peripheral edge of said screen carrier is adapted to be inserted, joints between the adjacent ends of said sections between the corners of the pans, said joints each comprising a compressed extension of the end of one section having a telescopic fit into the U-shaped recess of the next adjacent section leaving the opposite faces of the frame in the same plane, and a plurality of rivets for securing the peripheral edge of said wire screen in the U-shaped recess of said frame and for permanently securing the ends of the frame together at said joints to form a permanent frame with its upper and lower surfaces substantially in parallel planes.

5. A cracker pan comprising a carrier of wire screens cut to predetermined size, a frame having four corner sections each with a U-shaped recess into which the peripheral cut edge of said carrier is adapted to be inserted, joints between the adjacent ends of said sections between the corners of the pan, said joints each comprising a compressed extension of the end of one section having a telescopic fit into the U-shaped recess of the next adjacent section leaving the opposite faces of the frame in the same plane, a plurality of rivets for securing the peripheral edge of said carrier in said U-shaped recess of said frame and for securing the ends of said frame sections together at said joints, and a plurality of additional rivets distributed around the frame for securing the peripheral edge of the carrier thereto.

6. A cracker pan comprising a flat carrier, a frame entirely surrounding said carrier and having rounded edges at its periphery for handling, said frame having inside grooves for receiving the peripheral edge of said carrier, said frame comprising curved elbow sections with the ends of their legs in telescopic interfitting relation between the curved corners of the pan, and rivets for permanently securing the carrier to the frame and the elbow sections together at the joints between the ends of the interfitting legs thereof.

7. A cracker pan embodying in its construction a wire screen and a permanent frame therefor, said frame comprising a plurality of elbow sections curved at the corners of the pan and provided with legs the ends of which are in interfitting telescopic relation to form joints having their upper and lower surfaces flush with the upper and lower surfaces of the frame, each of said sections having rounded edges at their peripheries to facilitate handling and each of said sections being U-shaped in cross-section to form grooves for receiving the rough cut edge of the wire screen, and a plurality of rivets distributed around the frame to secure the wire screen permanently thereto and to permanently secure together the adjacent interfitting legs of said elbow sections to form a cracker pan with the upper and lower surfaces of the frame in parallel planes and with the wire screen in an intermediate plane.

In testimony whereof I have signed my name to this specification on this 4th day of October, A. D. 1928.

JOSEPH GEORGE JACKSON.